United States Patent [19]

Speece

[11] 3,926,588
[45] Dec. 16, 1975

[54] PRESSURIZED GAS TRANSFER SYSTEM

[76] Inventor: Richard E. Speece, 4516 Verplanck Place, N.W., Washington, D.C. 20016

[22] Filed: Nov. 28, 1973

[21] Appl. No.: 419,493

[52] U.S. Cl. .................... 55/52; 210/194; 210/221; 210/63
[51] Int. Cl.² ...................... B01D 19/00; C02B 1/34
[58] Field of Search ............. 55/52, 53; 210/65, 84, 210/102, 104, 194, 195, 220, 221, 14, 15, 63; 261/91, 93; 73/219; 137/563

[56] References Cited
UNITED STATES PATENTS

| | | | |
|---|---|---|---|
| 2,364,244 | 12/1944 | Roberson | 210/194 |
| 2,957,484 | 10/1960 | Nordin | 137/1 |
| 3,448,045 | 6/1969 | Hess et al. | 210/63 |
| 3,460,319 | 8/1969 | Tkach | 55/19 |
| 3,555,783 | 1/1971 | Grimshaw | 210/221 |
| 3,643,403 | 2/1972 | Speece | 55/53 |
| 3,775,314 | 11/1973 | Beitzel et al. | 210/198 R |
| 3,804,255 | 4/1974 | Speece | 210/221 |

Primary Examiner—Charles N. Hart
Attorney, Agent, or Firm—Clarence A. O'Brien; Harvey B. Jacobson

[57] ABSTRACT

The absorption of gas by a fluent material conducted through a gas transfer apparatus is enhanced by continuous pressurization while it is being recirculated alternately through two closed loops. Flow chambers in each of said closed loops, within which the fluent material is gasified during each cycle are alternately switched out of the closed loops so that the gasified fluent material accumulated therein may be displaced by flow from the source under a lower pressure than that of the fluent material trapped in the closed loops.

20 Claims, 5 Drawing Figures

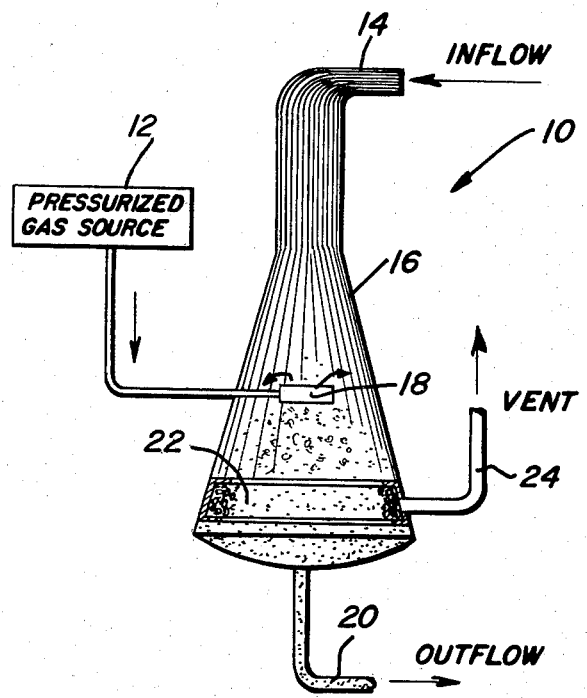
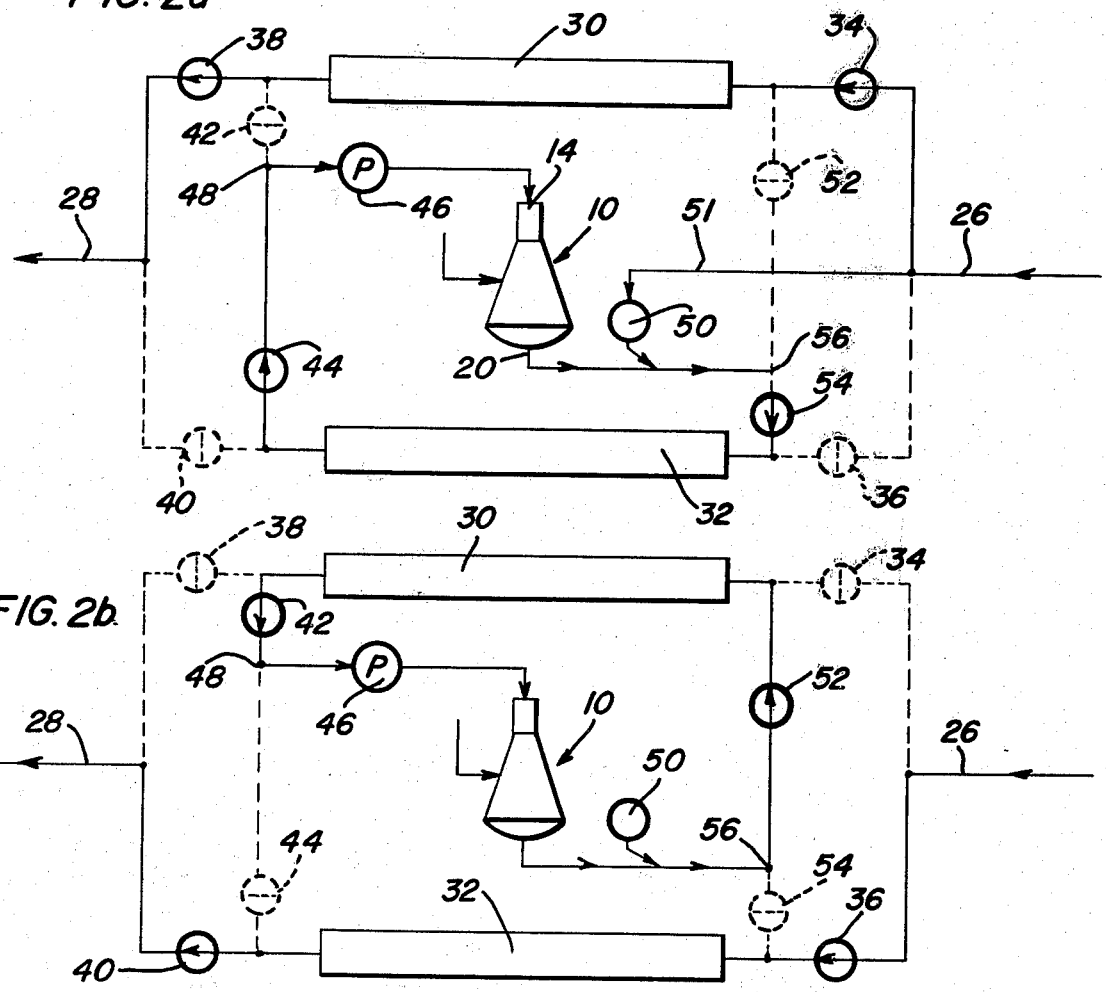

PRESSURIZED GAS TRANSFER SYSTEM

This invention relates to the transfer of a gas such as oxygen to a relatively incompressible liquid or fluent material and more particularly to a system for enhancing the absorption of the gas by pressurization of the liquid with a minimum expenditure of energy.

There are many processes in which a gas is transferred to and absorbed by a fluent material, as for example water to be aerated, the broth formed by aerobic fermentation, industrial waste sludge, and the black liquor from a pulp and paper mill. In such processes, the rate at which the gas, such as commercial oxygen, is transferred to the liquid limits production. To increase production, the liquid may be pressurized thereby enhancing absorption by (1) increasing the gas saturation value of the liquid and (2) reducing the gas stripping characteristics of extraneous gas in the liquid. Pressurization of the liquid being treated involves, however, the expenditure of a considerable amount of energy to maintain a flow of the liquid through the gas transfer apparatus under the desired high pressure.

It is therefore an important object of the present invention to enhance absorption of gas by a relatively incompressible fluent material in a gas transfer apparatus operating under an increased pressure without the normally high expenditure of energy associated therewith.

In accordance with the present invention, a high level of pressurization is achieved in a gas transfer system with negligible energy requirements, utilizing any suitable gas transfer device in the system such as a surface aerator, a countercurrent flow tower or the downflow bubble contact apparatus as disclosed in my prior copending application, Ser. No. 298,576, filed Oct. 18, 1972, now U.S. Pat. No. 3,643,403. The liquid is supplied from the source alternatively to two plug flow chambers against a relatively low back pressure sufficient to displace gasified liquid therefrom. The liquid is gasified in each flow chamber while sealed from the source by closing of valves during each operating cycle of the system. While sealed from the source the flow chamber is connected into a closed flow loop with the gas transfer device. A circulating pump induces recirculating flow of the liquid trapped in the flow loops while a pressurizing pump maintains the liquid being recirculated through the gas transfer device under a continuous pressure isolated by valves from the liquid inflow to and outflow from the system. The valves are operated in a predetermined sequence to effect the desired operational cycle of the system.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a schematic illustration of a gas transfer device associated with the system of the present invention.

FIGS. 2a and 2b are fluid circuit diagrams of the system in two different operational phases.

Figure 3:
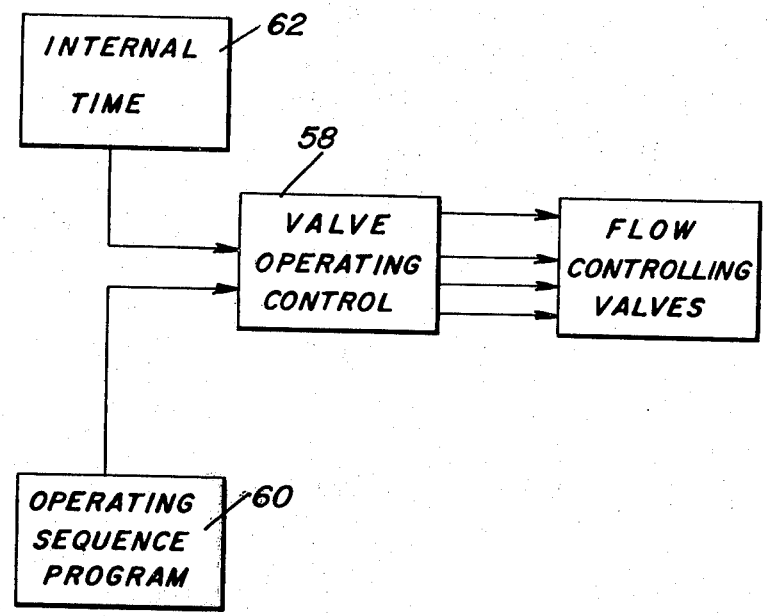
FIG. 3 is a block diagram of the controls associated with the system of the present invention.

Referring now to the drawings in detail, FIG. 1 illustrates a pressure sealed gas transfer device 10 of the type disclosed in my prior copending application aforementioned, with which the system of the present invention is associated. It should, however, be appreciated that the system is applicable to other gas transfer devices, within which absorption of a gas from a pressurized source 12 may be enhanced by increasing the pressure of the fluent material conducted thereto through its inlet 14. In the embodiment illustrated in FIG. 1, a fluid is introduced through inlet 14 to the top of a conical shaped chamber 16 at a velocity exceeding the buoyant velocity of the bubbles of gas injected by the gas injector 18. The gasified fluid emerges from the bottom of the chamber 16 through the outlet 20 at a velocity lower than the buoyant velocity of the gas bubbles resulting in an accumulation of bubbles at a stagnation zone 22 for prolonged contact between the gas and the fluid in the downflow stream in chamber 16. Extraneous gas not absorbed by the fluid may be vented from the stagnation zone by the vent conduit 24.

FIGS. 2a and 2b illustrate the basic system of the present invention wherein a fluent material from a suitable source under a relatively low pressure enters the system through an inlet conduit 26 and leaves the system in a gasified state through an outlet conduit 28. The fluent material such as a liquid is relatively incompressible and is delivered alternatively to two plug flow chambers 30 and 32 through a pair of inlet valves 34 and 36 against a relatively low back pressure. Outflow of liquid from the plug flow chambers is conducted to the outlet conduit 28 through a pair of outlet valves 38 and 40. A pair of inflow valves 42 and 44 are connected to the outlet ends of the flow chambers 30 and 32 upstream of the outlet valves 38 and 40 to respectively conduct liquid in a pair of closed, flow loops through the gas transfer device 10 common to both loops. Recirculating flow of the liquid through both of the closed loops is continuously induced by a circulating pump 46, the intake of which is connected to the juncture 48 between the inflow valves 42 and 44. The outlet of the pump 46 is connected to the inlet 14 of the gas transfer device 10 while its outlet 20 is connected to a pressurizing device 50. The device 50 may be an injector receiving a small flow through conduit 51 from the inlet 26 as shown in FIG. 2a, or an off-line pump, or a compressed gas chamber, sufficient to pressurize the closed, flow loops which are completed by opening of outflow valves 52 and 54 connected at juncture 56 to the outlet 20 and to the inlet ends of the flow chambers 30 and 32 downstream of the inlet valves 34 and 36.

By appropriately programming the opening and closing of valves 34, 36, 38, 40, 42, 44, 52 and 54, in a cyclic pattern matched to the inflow rate of liquid in inlet conduit 26 and the flow rate of liquid recirculated by pump 46 through the gas transfer device 10, the gas transfer device may be maintained continuously pressurized by the pump 50 with a minimal expenditure of energy. The pump 46 has no significant hydrostatic head to work against, only friction losses of the system. The operational cycle is furthermore timed so that the plug flow chambers 30 and 32 are alternatively gasified and the gasified contents thereof or plug displaced by ungassed liquid during a suitable interval of time. The flow chambers are also dimensioned in relation to the operating parameters of the system so as to minimize longitudinal mixing of the bodies of gasified and ungassed liquid for more efficient "plug" flow operation.

In FIG. 2a, illustrating the system in one phase of its operational cycle, the open valves and their connecting passages are shown in solid lines while the closed valves and their connecting passages are shown in dotted line. In this operational phase, a closed flow loop, isolated from the inlet and outlet conduits 26 and 28, is established by opening of valves 44 and 54 for recirculation of liquid under pressure through the gas transfer device 10 during a fill interval or cycle of suitable duration resulting in the gasification of the liquid in the plug flow chamber 32. The liquid in the other plug flow chamber 30, which was gasified during a previous cycle, is simultaneously displaced by flow of liquid from the inlet conduit 26 toward the outlet conduit 28 through opened valves 34 and 38 establishing a flow path through flow chamber 30 by-passing the gas transfer device 10. During the next operational cycle, the valves are switched to the condition illustrated in FIG. 2b, with the valves 36 and 40 open to establish flow through chamber 32 in by-pass relation to the closed flow loop established through chamber 30 and gas transfer device 10 by opening of valves 42 and 52. This closed flow loop is sealed from chamber 32 by closing of valves 44 and 54. Thus, each chamber 30 and 32 is alternately placed into a closed flow loop with the gas transfer device 10 to gasify the liquid under a relatively high pressure, and then emptied of the gasified liquid during the next cycle when it is switched to a flow path conducting the liquid under a relatively low pressure in by-pass relation to the gas transfer device.

In order to avoid loss of pressure and minimize the work of the pump 50, the opening and closing of valves is effected during a transitional phase in a predetermined sequence in order to change over from the phase shown in FIG. 2a, for example, to the phase shown in FIG. 2b. Thus, the open valves 34 and 38 are simultaneously closed initially to seal off chamber 30 from the inlet and outlet conduits. The closed valves 42 and 52 are then simultaneously opened to transfer chamber 30 into a recirculating flow loop with device 10. Next, valves 44 and 54 are closed to seal off chamber 32 and finally valves 36 and 40 opened to transfer chamber 32 to the by-pass flow path between the inlet and outlet conduits.

Operation of the valves in accordance with the foregoing program may be effected by an automatic valve operating control assembly 58 as diagrammatically shown in FIG. 3. The operating sequence is dictated by a control program 60 while the duration of the fill and emptying interval for the chambers 30 and 32 will be dictated by an interval timer 62.

Figure 4:
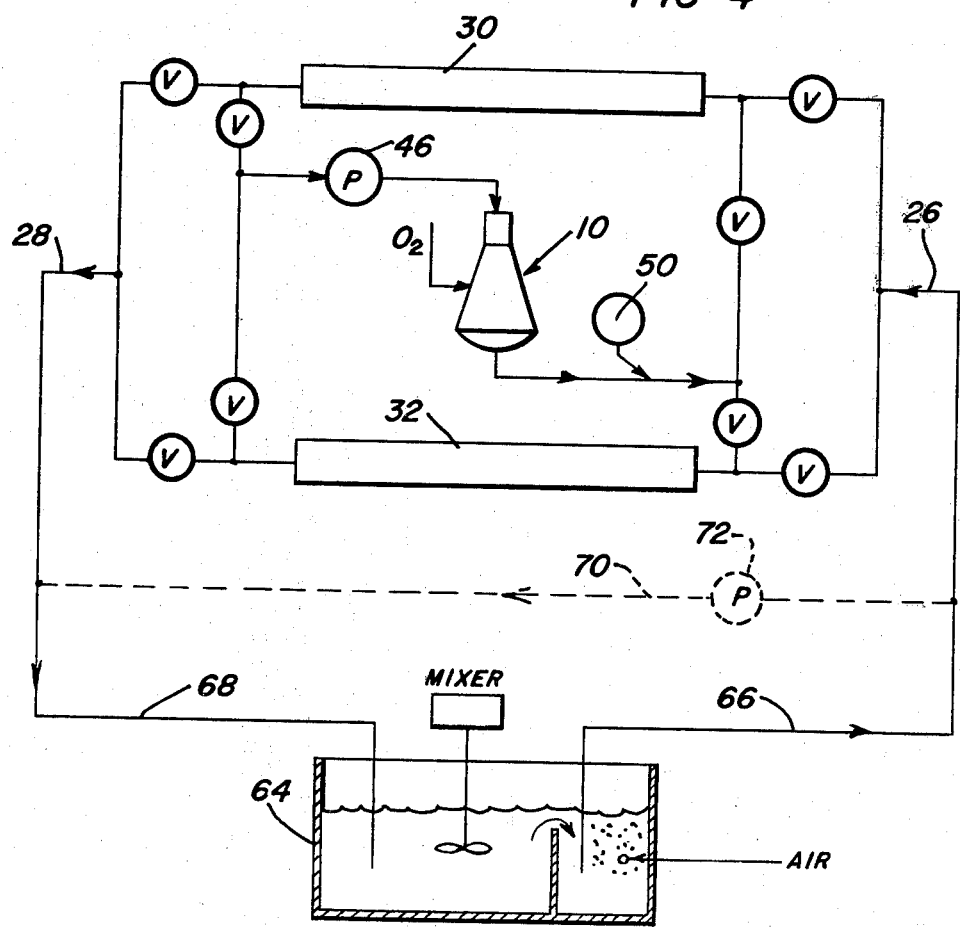
FIG. 4 is a fluid circuit diagram illustrating modifications of the system illustrated in FIGS. 2a and 2b.

FIG. 4 illustrates the same basic system described with respect to FIGS. 2a and 2b, applied for example, to a biological fermentation process in which a culture is formed in a reactor 64 from which an extraneous gas such as carbon dioxide is stripped out under atmospheric pressure by injecting air. The fluent material after stripping is directed through the system to add oxygen thereto through the gas transfer device 10 and a suspension returned to the reactor when replenished with oxygen. The inlet and outlet conduits 26 and 28 of the system are accordingly connected by lines 66 and 68 to the body of material in the reactor.

An alternative arrangement is also shown in FIG. 4 by means of dotted line 70 representing a by-pass side stream between the inlet and outlet conduits 26 and 28 through which flow is induced by a pump 72. This arrangement by diluting the gasified fluent material will permit greater concentrations of the gas in the portion of the flow stream passed through the system for blending with the side stream to minimize effervescence. A smaller system apparatus may thereby be utilized.

The system described with respect to FIGS. 2a and 2b could also be used as a supersaturation apparatus wherein air as the gas may be dissolved to such a supersaturation level that effervescence occurs when the liquid is depressurized. This phenomenon is useful in separation of solids by flotation. Where oxygen is dissolved resulting in effervescence upon depressurization, minute bubbles will be formed of such size as to be completely absorbed in a biological reactor and would not be detrimental to gas absorption efficiency. The system could be intermittently operated with a single plug flow chamber that is alternatively gasified as part of a closed loop containing the gas transfer device 10 and emptied of its gas contents by through-flow between the inlet and outlet of the system. On the other hand intermittent gasification and gas displacing flow could be effected in sequence through any number of plug flow chambers in accordance with the basic principles of the invention.

Where air is forced in as the gas and a high oxygen soluble liquid, such as some of the fluorocarbons which preferentially absorb oxygen over nitrogen gas, is utilized as the fluent material circulated through the gas transfer device 10, the system could be used to produce high purity oxygen or a gas of higher oxygen composition than air. Oxygen would be preferentially absorbed by the liquid operating under a relatively high pressure and upon exiting from the system the liquid would be depressurized in an aeration chamber by being subjected to a vacuum in order to strip out gas previously concentrated in the liquid. The stripped gas would hence have a higher oxygen content than air.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a gas transfer device for introducing a gas into a relatively incompressible fluent material conducted between inlet and outlet conduits, a low energy fluid pressurizing system including flow chamber means, flow circulating means for recirculating a body of the fluent material through a closed loop between the gas transfer device and said chamber means, conduit means for conducting flow of the fluent material under a predetermined pressure head between said inlet and outlet conduits through said chamber means independently of said closed loop, flow control valve means connected to the conduit means and the flow circulating means for separately establishing said recirculation in the closed loop through the chamber means and said flow through the chamber means between the inlet and outlet conduits to respectively gasify the fluent material accumulated in the chamber means and to permit displacement of the gasified fluent material from the chamber means, and valve operating means connected to the flow control valve means for alternating said recirculation of the fluent material through the chamber means and said displacement of the gasified fluent material from the chamber means.

2. The combination of claim 1 wherein said flow circulating means includes a circulating pump inducing flow through the gas transfer device at a rate matched to the inflow rate of the fluent material from the inlet conduit to establish a predetermined interval of time during which the fluent material is gasified in the chamber means and displaced therefrom, and means for maintaining the fluent material pressurized only while being recirculated in the closed loop above the pressure of the fluent material while being displaced 3. The combination of claim 2 wherein said chamber means includes at least two flow chambers within which fluent material is being gasified and from which gasified fluent material is being displaced, respectively, at the same time.

4. The combination of claim 3 wherein said flow control means comprises a pair of inlet valves connecting the inlet conduit to said chambers, a pair of outlet valves connecting said chambers to the outlet conduit, a pair of outflow valves conducting flow in opposite directions from the gas transfer device to said chambers and a pair of inflow valves conducting flow in opposite directions to the gas transfer device from said chambers.

5. The combination of claim 4 wherein said operating means comprises valve actuating means connected to said valves for alternatively opening one of the valves in each of the pairs of inlet, outlet, inflow and outflow valves to establish the closed loop through one of the chambers and flow through the other of the chambers between the inlet and outlet conduits.

6. The combination of claim 5 including by-pass passage means connected between the inlet and outlet conduits for conducting partial flow of the fluent material in parallel with flow through the chambers.

7. The combination of claim 1 wherein said chamber means includes at least two flow chambers within which fluent material is being gasified and from which gasified fluent material is being displaced, respectively, at the same time.

8. The combination of claim 7 wherein said flow control means comprises a pair of inlet valves connecting the inlet conduit to said chambers, a pair of outlet valves connecting said chambers to the outlet conduit, a pair of outflow valves conducting flow in opposite directions from the gas transfer device to said chambers and a pair of inflow valves conducting flow in opposite directions to the gas transfer device from said chambers.

9. The combination of claim 8 wherein said operating means comprises valve actuating means connected to said valves for alternatively opening one of the valves in each of the pairs of inlet, outlet, inflow and outflow valves to establish the closed loop through one of the chambers and flow through the other of the chambers between the inlet and outlet conduits.

10. The combination of claim 1 including by-pass passage means connected between the inlet and outlet conduits for conducting partial flow of the fluent material in parallel with flow through the chamber means.

11. The combination of claim 1 including reactor means connected to the outlet conduit for receiving the gasified fluent material, means for stripping extraneous gas from the gasified fluent material collected in the reactor means, and means for returning stripped fluent material from the reactor means to the inlet conduit.

12. A method of pressurizing a relatively incompressible fluent material conducted through a transfer device to enhance absorption of a relatively compressible fluid, including the steps of: inducing flow of fluent material through the transfer device; intermittently recirculating the fluent material between the transfer device and a collecting zone within which fluent material having said fluid absorbed therein is accumulated; intermittently conducting flow of the fluent material in by-pass relation to the transfer device through said collecting zone following said accumulation of fluent material therein; and maintaining the fluent material pressurized only during recirculation through the transfer device.

13. The method of claim 12 wherein said compressible fluid is oxygen.

14. The method of claim 13 wherein said fluent material is industrial waste sludge.

15. The method of claim 13 wherein said fluent material is a paper pulp liquor.

16. The method of claim 13 wherein said fluent material is a broth formed in an aerobic fermentation process.

17. The method of claim 12 including the steps of: sequentially conducting said recirculating flow through at least one additional collecting zone to accumulate fluent material therein; and sequentially conducting said flow of the fluent material in by-pass relation to the transfer device through said additional collecting zone to displace the fluent material therefrom.

18. The method of claim 17 wherein the sequence of flow through the collecting zones and the transfer device is cyclically repeated and timed to maintain the transfer device pressurized continuously.

19. In combination with the method defined in claim 18, the step of: depressurizing the fluent material within which said fluid is previously absorbed to strip out the fluid, said fluid being oxygen and the fluent material being an oxygen soluble liquid.

20. In combination with a pipeline through which a liquid is flowing under pressure, an apparatus for transferring a gas to the liquid, comprising a mixing device into which the gas is injected, a first plug flow chamber, a second plug flow chamber, conduit means connecting opposite ends of each plug flow chamber with said mixing device and said pipeline, flow inducing means for recirculating the liquid between the mixing device and said plug flow chambers, and valve means for alternately establishing fluid communication between each plug flow chamber and the mixing device while blocking communication between the plug flow chamber and the pipeline and between each plug flow chamber and the pipeline, whereby the plug flow chambers alternately conduct gasified liquid to and from the mixing device and are emptied of gasified liquid by liquid conducted from the pipeline.

* * * * *